(12) United States Patent
Kinomoto (10) Patent No.: US 11,323,439 B2
(45) Date of Patent: May 3, 2022

(54) DEVICE MANAGEMENT APPARATUS, METHOD OF MANAGING DEVICE, DEVICE MANAGEMENT SYSTEM, AND NON-TRANSITORY RECORDING MEDIUM

(71) Applicant: Tsutomu Kinomoto, Kanagawa (JP)

(72) Inventor: Tsutomu Kinomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 16/444,102

(22) Filed: Jun. 18, 2019

(65) Prior Publication Data

US 2020/0036713 A1 Jan. 30, 2020

(30) Foreign Application Priority Data

Jul. 27, 2018 (JP) .............................. JP2018-141845

(51) Int. Cl.
*H04L 9/40* (2022.01)
*H04L 29/06* (2006.01)

(52) U.S. Cl.
CPC .......... *H04L 63/0884* (2013.01); *H04L 63/20* (2013.01)

(58) Field of Classification Search
CPC ............................. H04L 63/0884; H04L 63/20
USPC .......................................................... 726/7
See application file for complete search history.

(56) References Cited

U.S. PATENT DOCUMENTS

| | | | | |
|---|---|---|---|---|
| 9,143,933 B2* | 9/2015 | Ikeda | ................. | H04N 1/00244 |
| 2002/0165984 A1 | 11/2002 | Yuki | | |
| 2005/0086654 A1 | 4/2005 | Sumi et al. | | |
| 2005/0128957 A1 | 6/2005 | Yuki | | |
| 2006/0029082 A1 | 2/2006 | Yuki | | |
| 2006/0274371 A1* | 12/2006 | Sakai | ...................... | H04L 41/00 358/1.15 |

(Continued)

FOREIGN PATENT DOCUMENTS

| | | |
|---|---|---|
| JP | 2003-150351 | 5/2003 |
| JP | 2004-038385 | 2/2004 |

(Continued)

OTHER PUBLICATIONS

Kim et al., "Device Certification System and Method for User's convenient contents use", 2007 IEEE Future Generation Communication and Networking (Year: 2007).*

(Continued)

*Primary Examiner* — Khalil Naghdali
(74) *Attorney, Agent, or Firm* — IPUSA, PLLC (57) ABSTRACT

A device management apparatus communicably connected to a terminal device through a network includes a processor. The processor acquires, via the terminal device, first device information that is information on a specific device connected to the terminal device and license information indicating a license given to the device. The processor refers to a memory that stores second device information to determine whether the first device information is identical to the second device information. The processor transmits, when the acquired first device information is different from the second device information, the license information to an authentication server to determine whether to reflect the first device information to the second device information according to an authentication result received from the authentication server.

9 Claims, 9 Drawing Sheets

(56) References Cited

U.S. PATENT DOCUMENTS

| | | | |
|---|---|---|---|
| 2006/0277446 A1* | 12/2006 | Ikeno | H04N 1/00244 |
| | | | 714/47.3 |
| 2007/0061438 A1 | 3/2007 | Yuki | |
| 2007/0195781 A1 | 8/2007 | Yuki | |
| 2009/0222545 A1 | 9/2009 | Yuki | |
| 2012/0066034 A1* | 3/2012 | Nolan | G06Q 20/10 |
| | | | 705/14.1 |
| 2013/0132530 A1* | 5/2013 | Asahara | H04N 1/4433 |
| | | | 709/220 |
| 2013/0238776 A1 | 9/2013 | Kinomoto | |
| 2014/0143399 A1 | 5/2014 | Kinomoto | |
| 2015/0319132 A1* | 11/2015 | Moon | H04L 61/106 |
| | | | 709/245 |
| 2015/0358172 A1 | 12/2015 | Kinomoto | |
| 2017/0272328 A1* | 9/2017 | Kinomoto | H04L 41/22 |
| 2018/0039985 A1* | 2/2018 | Siegler | H04L 63/20 |
| 2019/0056898 A1* | 2/2019 | Mizuta | G06F 3/1288 |

FOREIGN PATENT DOCUMENTS

| | | |
|---|---|---|
| JP | 2004-185352 | 7/2004 |
| JP | 2004-252785 | 9/2004 |
| JP | 2004-252888 | 9/2004 |
| JP | 2004-318296 | 11/2004 |
| JP | 2005-024594 | 1/2005 |
| JP | 2005-115920 | 4/2005 |
| JP | 2005-204279 | 7/2005 |
| JP | 2005-235234 | 9/2005 |
| JP | 2006-024187 | 1/2006 |
| JP | 2006-065432 | 3/2006 |
| JP | 2007-080173 | 3/2007 |
| JP | 2007-109215 | 4/2007 |
| JP | 2007-221565 | 8/2007 |
| JP | 2008-072519 | 3/2008 |
| JP | 2008-221600 | 9/2008 |
| JP | 2008-310472 | 12/2008 |
| JP | 2009-071518 | 4/2009 |
| JP | 2009-238203 | 10/2009 |
| JP | 2010-072758 | 4/2010 |
| JP | 2010-218245 | 9/2010 |
| JP | 2011-170412 | 9/2011 |
| JP | 2011-224996 | 11/2011 |
| JP | 2011-227818 | 11/2011 |
| JP | 2012-138113 | 7/2012 |
| JP | 2013-186631 | 9/2013 |
| JP | 2013-232221 | 11/2013 |
| JP | 2014-078275 | 5/2014 |
| JP | 2014-103531 | 6/2014 |
| JP | 2014-170294 | 9/2014 |
| JP | 2014-170584 | 9/2014 |
| JP | 2015-230642 | 12/2015 |
| JP | 2017-167824 | 9/2017 |
| JP | 2017-194751 | 10/2017 |

OTHER PUBLICATIONS

Kim et al., 2007 IEEE Conferences (FGCN 2007), "Device Certification System and Method for User's convenient contents use" (Year: 2007).*

* cited by examiner

| LOCAL DEVICE 400 ||
|---|---|
| IP ADDRESS | 11.22.33.44 |
| MAC ADDRESS | 11:22:33:44:55:66:77:88 |
| SERIAL NUMBER | aabbccddeeff |
| VENDER NAME | AAA |
| LICENSE ID | LICENSE A |
| COUNTER | .... |
| TONER REMAIN- ING AMOUNT | .... |

| LICENSE ID | SERIAL NUMBER | SUPPORTED FUNCTION |
|---|---|---|
| LICENSE A | aabbccddeeff | COPY, FAX, SCAN |
| LICENSE B | .... | .... |
| | | |

| LICENSE ID | SERIAL NUMBER | SUPPORTED FUNCTION | |
|---|---|---|---|
| LICENSE A | ffeeddccbaa | COPY, FAX, SCAN | 611 |
| LICENSE B | .... | .... | |

| LOCAL DEVICE 400-1 | | |
|---|---|---|
| IP ADDRESS | 11.22.33.44 | |
| MAC ADDRESS | 11:22:33:44:55:66:77:88 | |
| SERIAL NUMBER | ffeeddccbaa | 211 |
| VENDER NAME | AAA | |
| LICENSE ID | LICENSE A | |
| COUNTER | .... | |
| TONER REMAINING AMOUNT | .... | |

FIG. 10B

DEVICE MANAGEMENT APPARATUS, METHOD OF MANAGING DEVICE, DEVICE MANAGEMENT SYSTEM, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2018-141845, filed on Jul. 27, 2018, in the Japan Patent Office, the entire disclosure of which is hereby incorporated by reference herein.

BACKGROUND

Technical Field

Embodiments of the present disclosure relate to a device management apparatus, a method of managing a device, a device management system, and a non-transitory recording medium storing instructions for executing a method of managing a device.

Related Art

A device management system in which a device management server manages a plurality of devices connected to the device management server through a network or the like is known. In recent years, target devices to be managed include peripheral devices that are locally connected (hereinafter referred to as local devices), in addition to devices connected to the network, and the device management system also provides services to manage and perform maintenance of the local devices.

For example, when power of a printer is turned on, a monitoring device inquiries about a serial number of the printer. When the serial number is different from that of a printer previously used, current printing processing is forced to be stopped, a log of the previous printer is uploaded, and setting information for the current printer is generated.

SUMMARY

An exemplary embodiment of the present disclosure includes a device management apparatus communicably connected to a terminal device through a network. The device management apparatus includes a processor. The processor acquires, via the terminal device, first device information that is information on a specific device connected to the terminal device and license information indicating a license given to the device. The processor refers to a memory that stores second device information to determine whether the first device information is identical to the second device information. The processor transmits, when the acquired first device information is different from the second device information, the license information to an authentication server to determine whether to reflect the first device information to the second device information according to an authentication result received from the authentication server.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Figure 1:
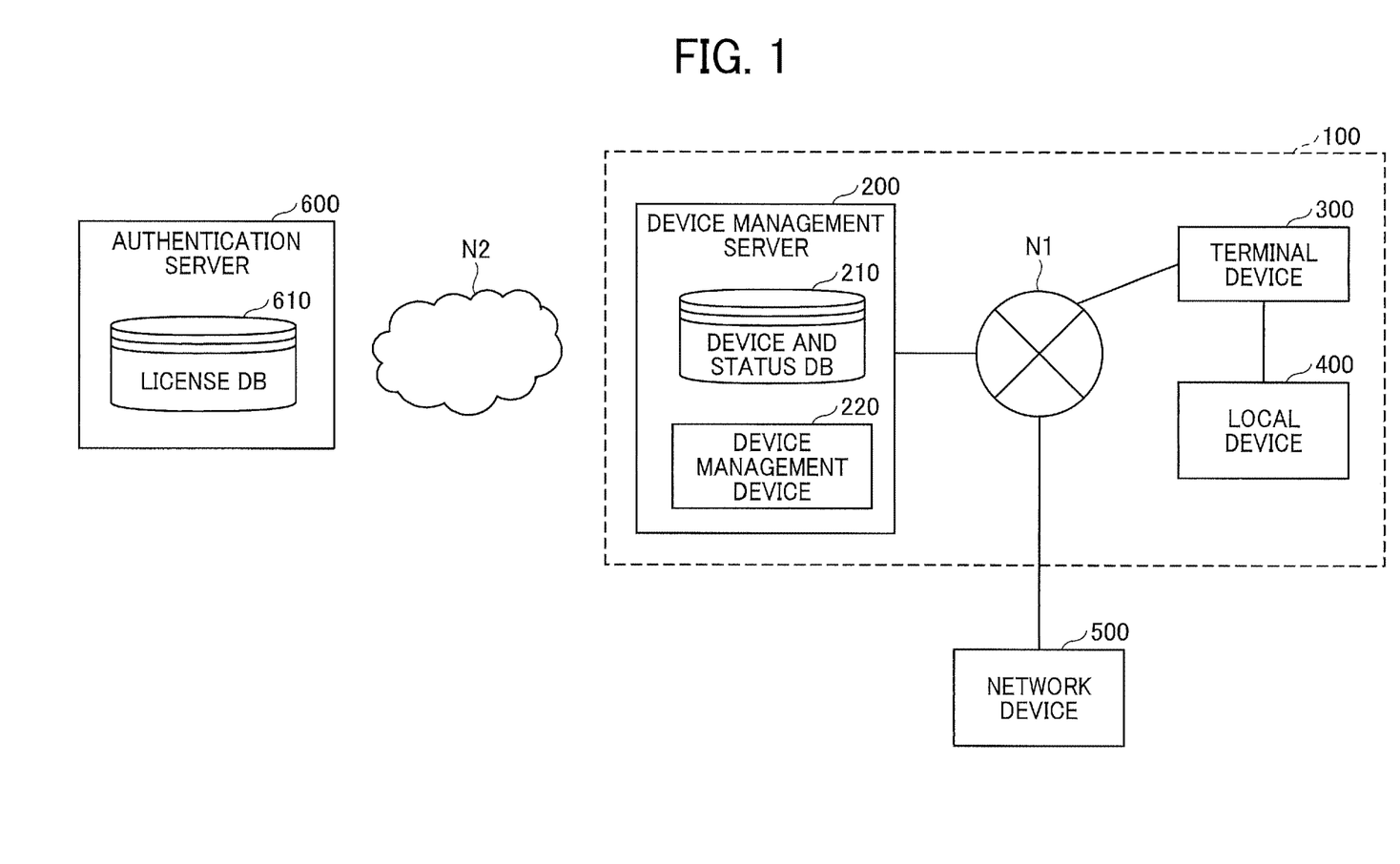
FIG. 1 is a diagram illustrating an example of a configuration of a device management system according to an embodiment of the present disclosure.

A description is given below of an embodiment of the present disclosure, with reference to drawings. FIG. 1 is a diagram illustrating an example of a configuration of a device management system 100 according to an embodiment of the present disclosure.

The device management system 100 according to the present embodiment includes, for example, a device management server (device management apparatus) 200, a terminal device 300, and a local device 400.

In the device management system 100, the device management server 200 and the terminal device 300 are connected to each other through a network N1 such as a wireless local area network (LAN). In addition, the terminal device 300 and the local device 400 are connected to each other by, for example, a universal serial bus (USB). That is, the local device 400 is not connected to the device management server 200 through the network N1, but is connected to the terminal device 300.

The local device 400 according to the present embodiment may be, for example, a printer, a scanner, or the like, or may be a multifunction peripheral having a plurality of functions such as a print function, a scan function, and the like. The local device 400 may be any device capable of connecting to the terminal device 300 by a USB connection. Alternatively, the local device 400 and the terminal device 300 may be connected to each other by a connection method other than the USB connection.

In addition, the device management server 200 may be connected to a network device 500. The network device 500 is a device connected to the device management server 200 through the network N1. The terminal device 300 is a type of the network device 500.

In addition, the device management server 200 according to the present embodiment communicates with an authentication server 600 through a network such as the Internet N2. The authentication server 600 has a license database (DB) 610, and authenticates the local device 400 in response to an inquiry received from the device management server 200.

The device management server 200 according to the present embodiment includes, for example, a device and status database 210 (device status database 210) and a device management device 220.

The device and status database 210 (device status DB 210) stores device information that is information on one or more devices managed by the device management server 200. The device information also includes information on status related the one or more devices. Hereinafter, the device information is also referred to as device and status information (device status information).

The device management device 220 causes the authentication server 600 to authenticate license information indicating a license given to the local device 400 and takes over (transfer, inherit) the device and status information of the local device 400 according to the authentication result.

In the example of FIG. 1, each of the number of the terminal devices 300 and the number of the local devices 400 included in the device management system 100 is one, but the present disclosure is not limited thereto. The device management system 100 may include any number of network devices 500. In addition, any number of local devices 400 may be connected to the network device 500.

In addition, in the example of FIG. 1, the device and status database 210 is provided in the device management server 200, but the present disclosure is not limited thereto. The device and status database 210 may be provided outside the device management server 200.

Furthermore, in the example of FIG. 1, the authentication server 600 is provided separately from the device management server 200, but the present disclosure is not limited thereto. For example, the device management server 200 may be provided on the Internet N2 and may have the functions of the authentication server 600. That is, the device management server 200 may also serve as the authentication server 600.

Figure 2:
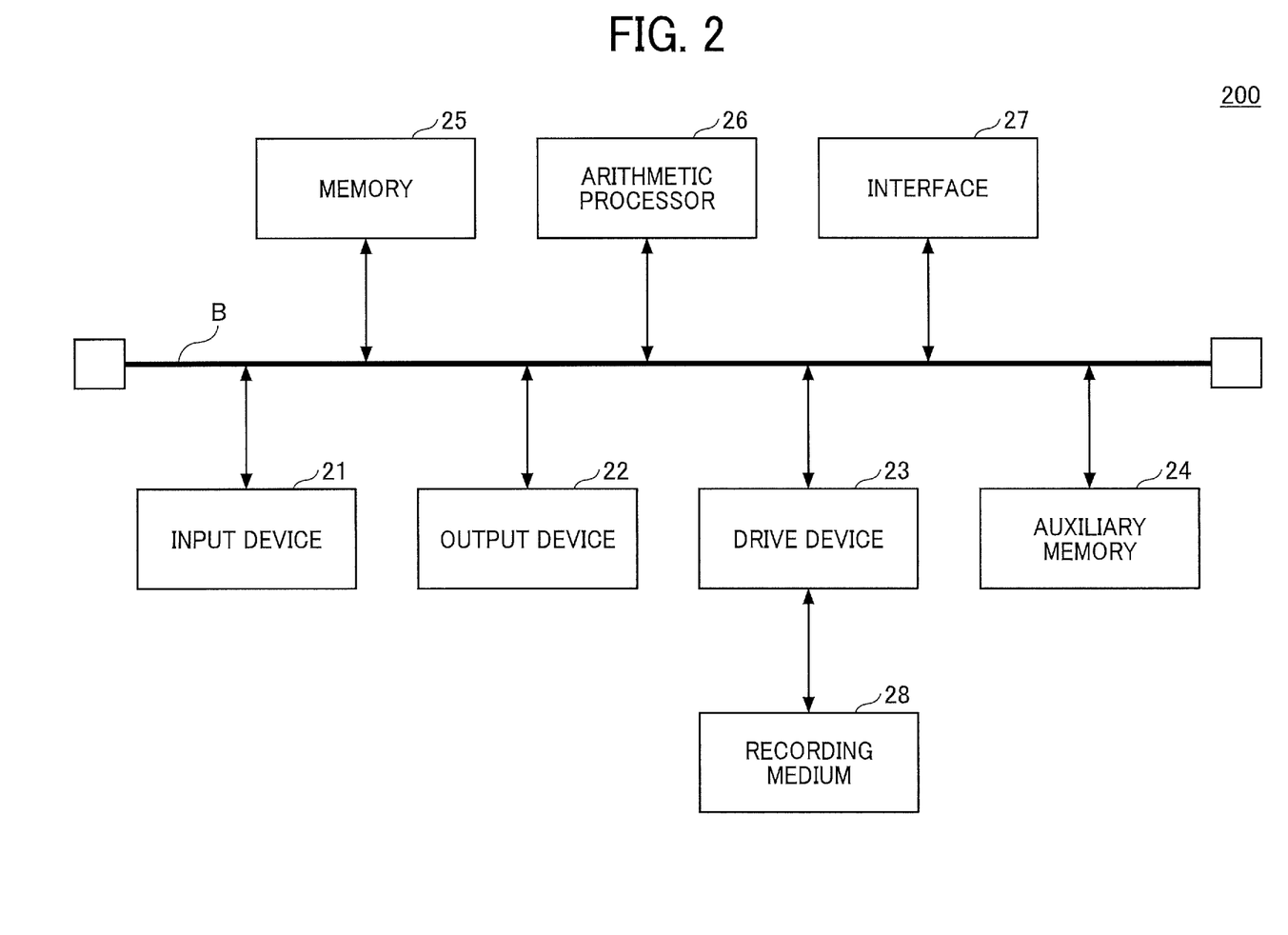
FIG. 2 is a block diagram illustrating an example of a hardware configuration of the device management server according to an embodiment of the present disclosure.

A description is now given of the device management server 200 according to the present embodiment, with reference to FIG. 2. FIG. 2 is a block diagram illustrating an example of a hardware configuration of the device management server 200.

The device management server 200 according to the present embodiment includes, for example, an input device 21, an output device 22, a drive device 23, an auxiliary memory 24, a memory 25, an arithmetic processor 26, and an interface 27 that are connected to each other through a bus B.

The input device 21 is a device for inputting various kinds of information and includes, for example, a keyboard and a pointing device. The output device 22 is a device for outputting various kinds of information and includes, for example, a display. The interface 27 includes a LAN card, etc., and is used for connecting to a network.

A device management program is at least a part of various programs for controlling the device management server 200. The device management program is provided, for example, by being distributed with a recording medium 28 or downloaded from a network. The recording medium 28 storing the device management program can be implemented by various types of recording medium such as a recording medium that optically, electrically or magnetically records information, such as a compact disk read only memory (CD-ROM), a flexible disk, or a magneto-optical disk, or a semiconductor memory that electrically records information, such as a read only memory (ROM), or a flash memory.

In addition, when the recording medium 28 storing the device management program is set in the drive device 23, the device management program is installed from the recording medium 28 to the auxiliary memory 24 via the drive device 23. The device management program downloaded from the network is installed in the auxiliary memory 24 via the interface 27.

The auxiliary memory 24 stores the installed device management program, and further stores necessary files, data, etc. The memory 25 stores the device management program read from the auxiliary memory 24 when the device management server 200 is started. The arithmetic processor 26, such as a central processing unit (CPU), implements various processes as described later according to programs stored in the memory 25.

The hardware configuration of the terminal device 300 of the present embodiment is substantially the same as that of the device management server 200, and the description thereof is omitted here. Note that the terminal device 300 may be, for example, a tablet type terminal device, a smartphone, or the like, and may have a display operation device implemented by a touch panel or the like instead of the input device 21 and the output device 22.

Figure 3:
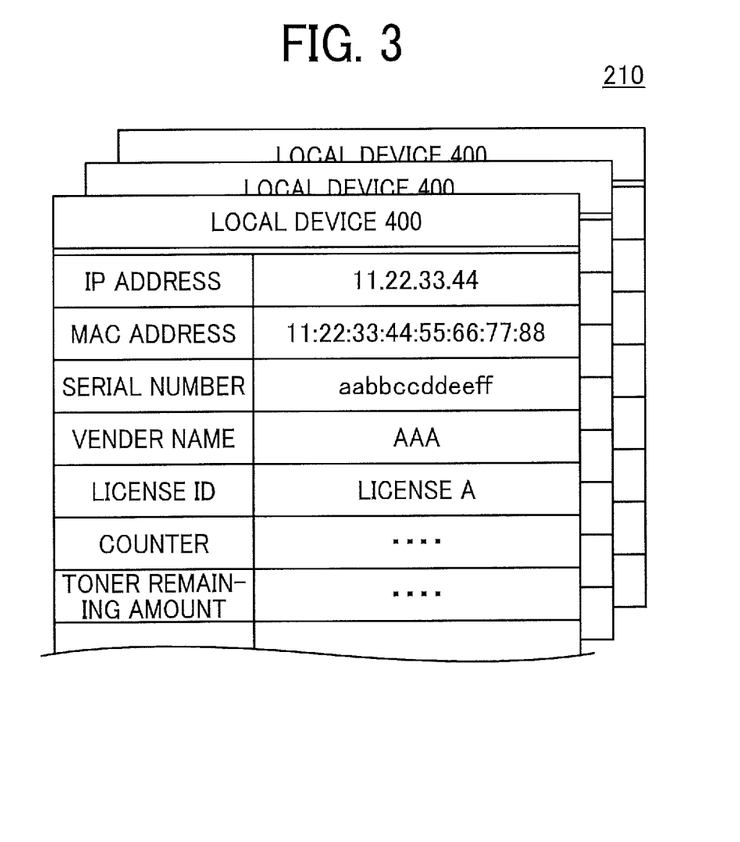
FIG. 3 is an illustration of a device and status database, according to an embodiment of the present disclosure.

A description is now given of the device and status database 210 of the device management server 200, with reference to FIG. 3. FIG. 3 is an illustration of the device and status database 210, according to the present embodiment.

In the device and status database 210 according to the present embodiment, device and status information, which is information on a device and statuses related to the device is stored for each local device 400.

The device and status information includes, for example, an internet protocol (IP) address, a media access control (MAC) address, a serial number, a vendor name, a license identifier (ID), a counter value, a toner remaining amount, and the like as items of information, but not limited thereto. The items of information included in the device and status information varies according to the type of the local device 400.

Figure 4:
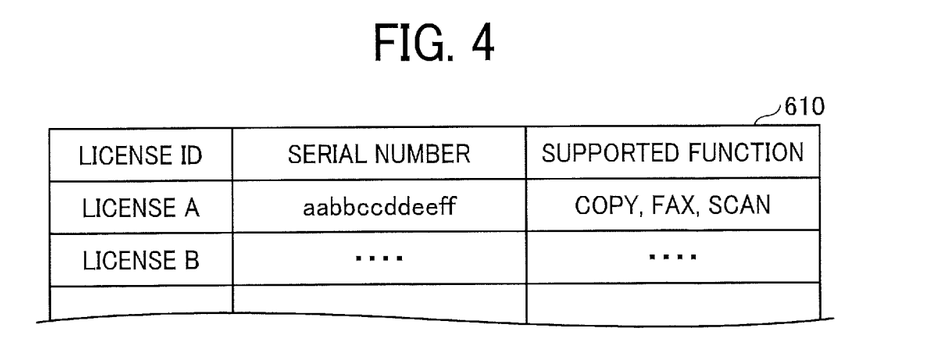
FIG. 4 is an illustration of a license database, according to an embodiment of the present disclosure.

A description is now given of the license database 610, according to the present embodiment, with reference to FIG. 4. FIG. 4 is an illustration of the license database 610, according to the present embodiment.

The license database 610 according to the present embodiment has "license ID", "serial number", and "supported function" as items of information, and the item of "license ID" is associated with other items. In the following description, information including a value of the item of "license ID" and values of the other items is referred to as license information.

The value of the item of "license ID" is information for identifying a license given to the local device 400 or the network device 500. The value of the item of "serial number" is information for identifying a specific device to which the license ID is given. The value of the item of "supported function" indicates one or more functions associated with the license ID.

In the example of FIG. 4, for example, a license with the license ID of "license A" is a license that permits the use of three functions including a copy function, a facsimile communication (FAX) function, and a scan function. This license is given to the specific device identified by the specific serial number of "aabbccddeeff".

Figure 5:
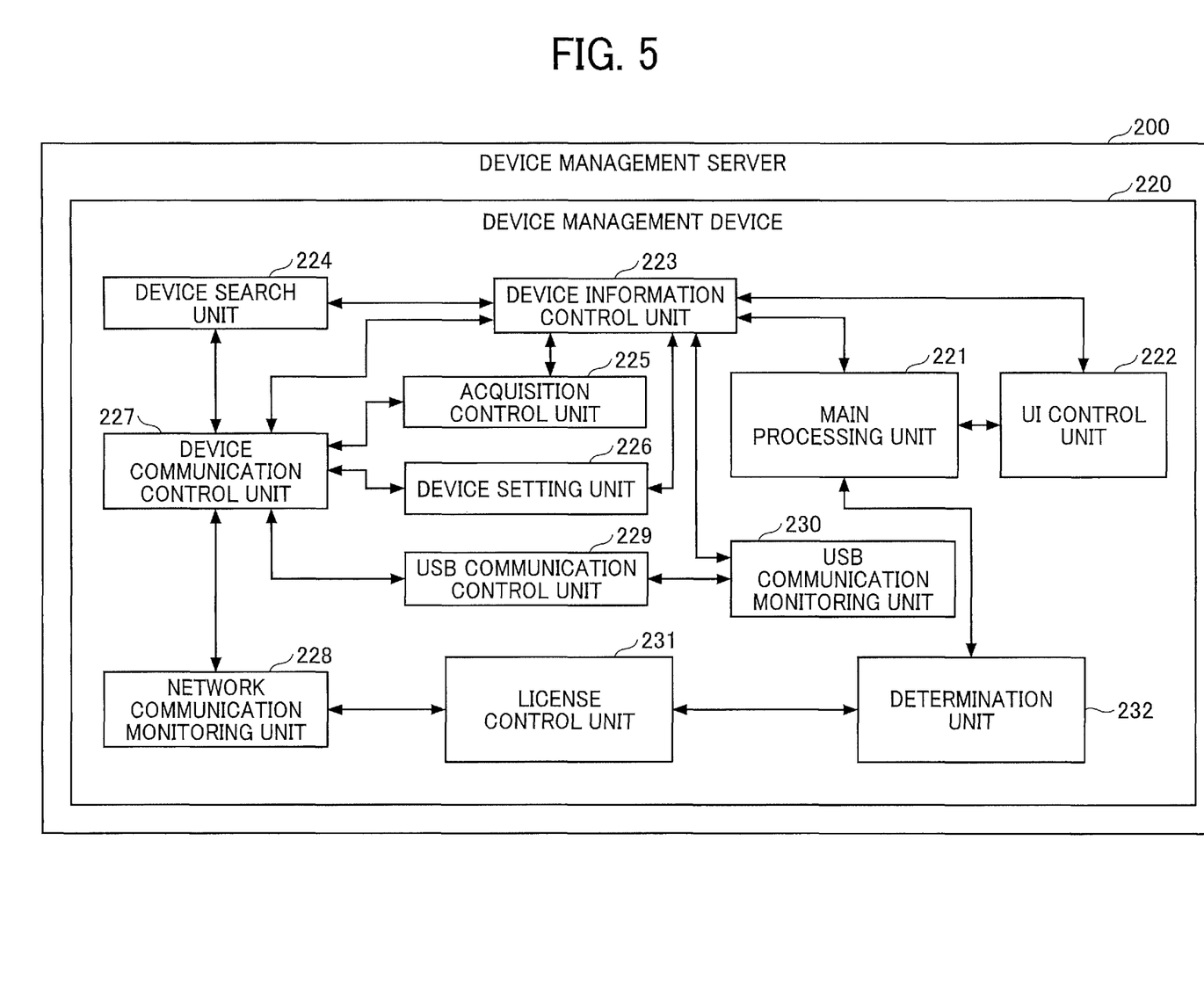
FIG. 5 is a bock diagram illustrating functions of a device management server according to an embodiment of the present disclosure.
Figure 6:
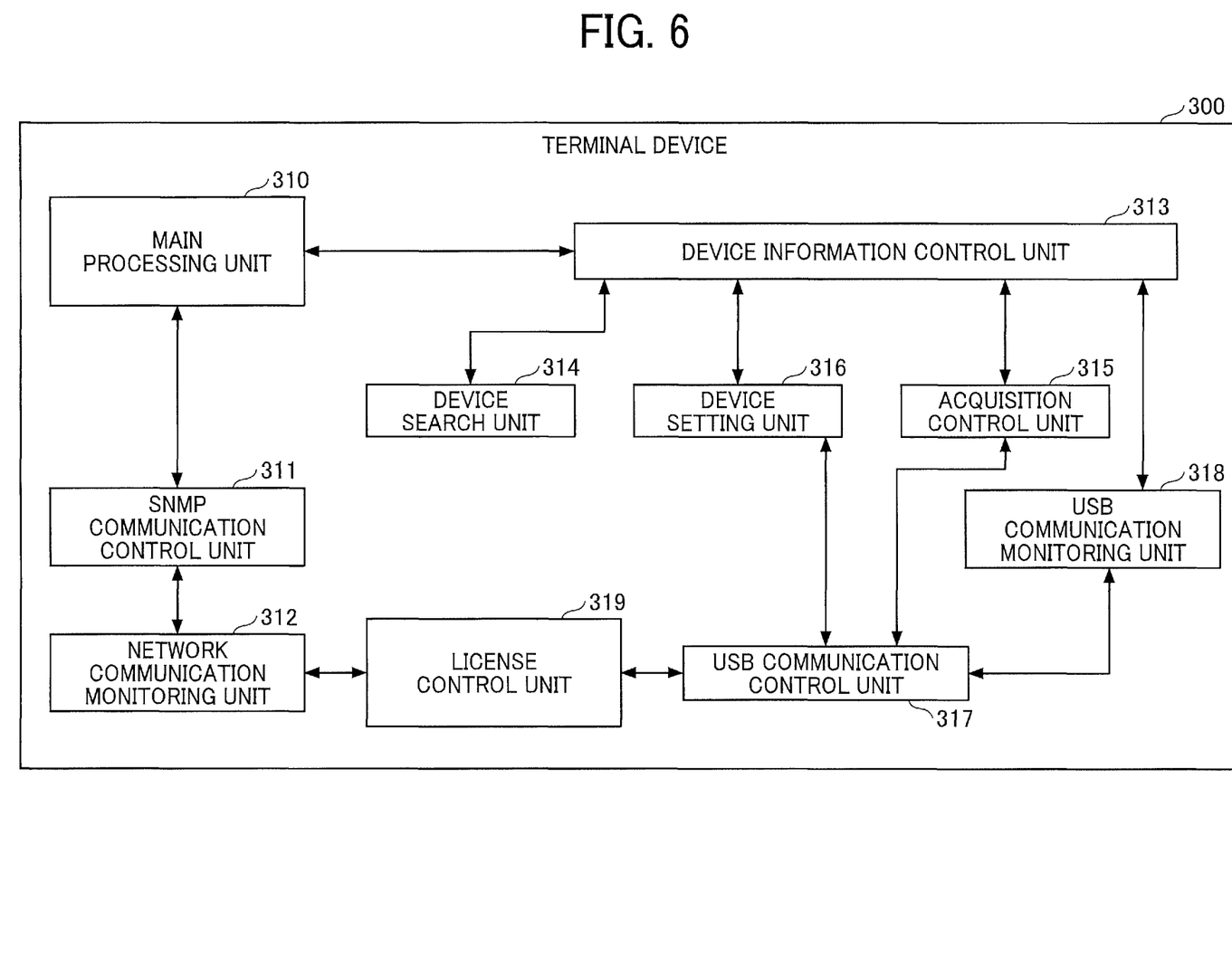
FIG. 6 is a block diagram illustrating functions of a terminal device according to an embodiment of the present disclosure.

A description is now given of functions of each of the devices included in the device management system 100 according to the present embodiment, with reference to FIG. 5 and FIG. 6.

FIG. 5 is a functional bock diagram illustrating functions of the device management server 200. The device management device 220 of the device management server 200 according to the present embodiment includes, for example, a main processing unit 221, a user interface (UI) control unit 222, a device information control unit 223, a device search unit 224, an acquisition control unit 225, a device setting unit 226, a device communication control unit 227, a network communication monitoring unit 228, a USB communication control unit 229, a USB communication monitoring unit 230, a license control unit 231, and a determination unit 232.

The main processing unit 221 controls the overall operation of the device management server 200. More specifically, the main processing unit 221 performs various searching, polling, setting, and the like for the local device 400.

The UI control unit 222 causes the output device 22 or the like to display a management screen in relation to a device managed by the device management server 200. More specifically, the UI control unit 222 may cause a web browser to display the management screen. In other words, the UI control unit 222 is a display control unit. In addition, the UI control unit 222 may cause a management terminal or the like connected to the device management server 200 to display the management screen. In addition, the UI control unit 222 receives an operation performed on the management screen by an administrator.

The device information control unit 223 acquires device and status information from the local device 400 to be stored in the device and status database 210. In addition, the device information control unit 223 according to the present embodiment acquires license information from the local device 400, and passes (transfers) the license information to the license control unit 231.

The device search unit 224 searches for one or more devices connected to the device management server 200 by various search methods. In addition, the device search unit 224 selects a protocol for performing the device search.

The acquisition control unit 225 controls a method of acquiring the device and status information. The method to acquire the device and status information includes, for example, a method by using a standard a management information base (MIB), a method by using a simple network management protocol (SNMP) communication using a private MIB, and a method by using a simple object access protocol (SOAP) communication using a web service.

The device setting unit 226 sets various settings for, for example, the local device 400 and the network device 500.

The device communication control unit 227 controls an access method to access, for example, the local device 400 or the network device 500. Examples of the access method include a SNMP communication using an IP address, a SOAP communication, a USB communication using a USB port, and the like.

The network communication monitoring unit 228 controls communication between the own device (i.e., the device management server 200) and another device. Controlling the communication means controlling a time to start establishing a communication, managing transmission and reception of data, or the like.

The USB communication control unit 229 controls communication using the USB port. The USB communication monitoring unit 230 receives a shutdown notification from a device connected via the USB port, receives a disconnection notification of the USB communication from an Operating System (OS), and the like.

The license control unit 231 transmits the license information to the authentication server 600 via the network communication monitoring unit 228 and causes the authentication server 600 to authenticate the license information. In addition, the license control unit 231 determines whether to take over (inherit) the device and status information acquired from the terminal device 300 or not, according to an authentication result from the authentication server 600.

The determination unit 232 determines whether the local device 400 connected to the terminal device 300 is the same device having device and status information that is previously acquired or not, based on the device and status information that is currently acquired.

A description is now given of functions of the terminal device 300 according to the present embodiment, with reference to FIG. 6. FIG. 6 is a block diagram illustrating functions of the terminal device 300.

The terminal device 300 according to the present embodiment includes, for example, a main processing unit 310, an SNMP communication control unit 311, a network communication monitoring unit 312, a device information control unit 313, a device search unit 314, an acquisition control unit 315, a device setting unit 316, a USB communication control unit 317, a USB communication monitoring unit 318, and a license control unit 319.

The main processing unit 310 controls the local device 400 based on an instruction or a request to the local device 400 from the device management server 200.

The SNMP communication control unit 311 establishes a SNMP communication between the own device (i.e., terminal device 300) and the device management server 200. The network communication monitoring unit 312 controls communication between the own device (i.e., terminal device 300) and the device management server 200.

The device information control unit 313 acquires device and status information from the local device 400 and outputs the device status information to the device management server 200. In addition, the device information control unit 313 searches for the local device 400, sets for the local device 400, or the like.

The device search unit 314 searches for a port of a USB printer possessed by the OS installed on the terminal device 300.

The acquisition control unit 315 acquires the device and status information using a USB communication protocol. In addition, the acquisition control unit 315 periodically receives the device and status information from the local device 400.

The device setting unit 316 sets to cause the local device 400 to periodically transmit the device and status information of the local device 400 to the terminal device 300.

The USB communication control unit 317 establishes a USB communication using the USB port. The USB communication monitoring unit 318 receives a shutdown notification from the local device 400 or receives a disconnection notification of the USB communication from the OS, for example.

The license control unit 319 acquires the license information from the local device 400 in response to a license information acquisition request.

Figure 7:
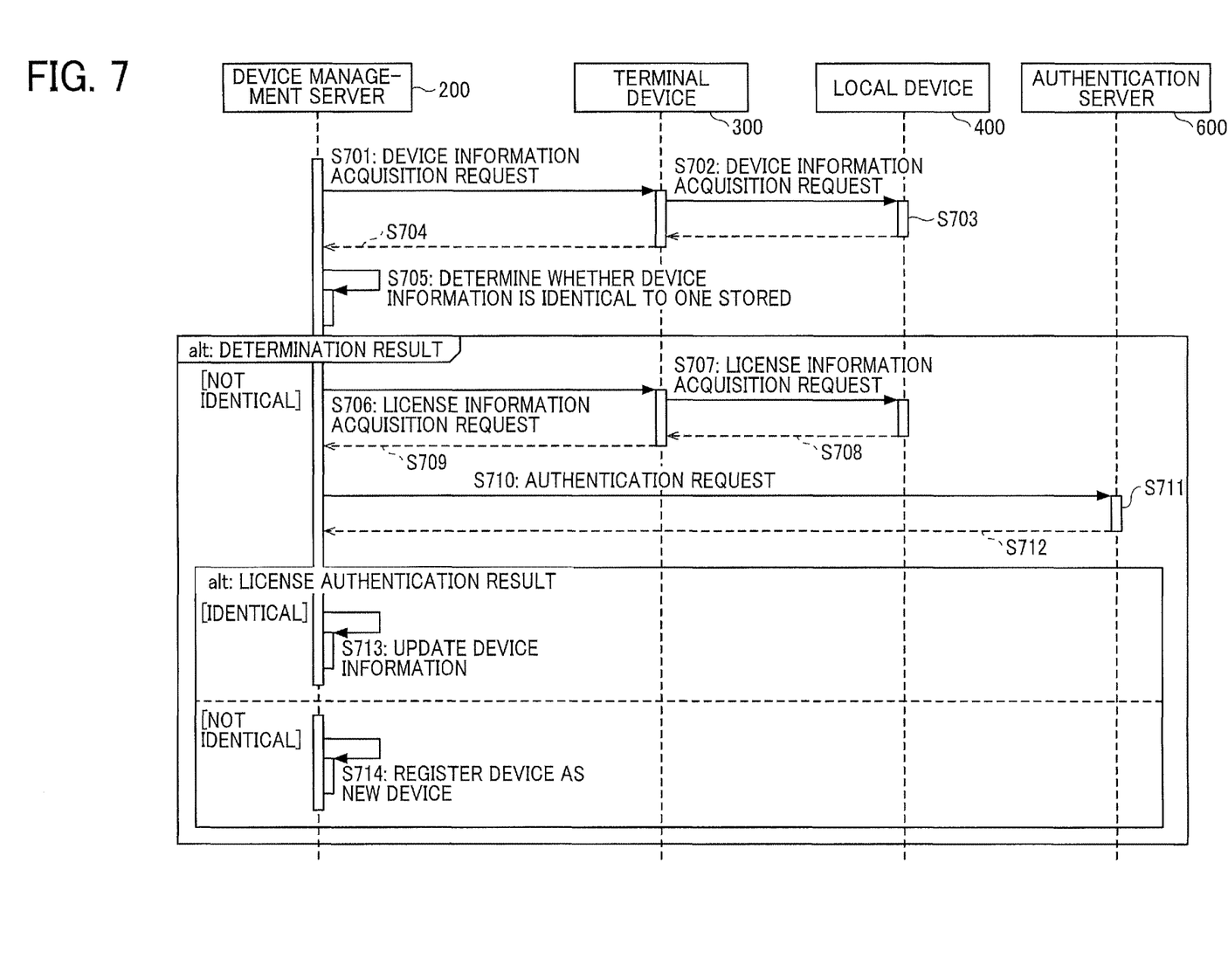
FIG. 7 is a sequence diagram illustrating a process performed by a device management system according to an embodiment of the present disclosure.

A description is now given of a process performed by the device management system 100 according to the present embodiment, with reference to FIG. 7. FIG. 7 is a sequence diagram illustrating the process performed by the device management system 100, according to the present embodiment.

In the device management system 100 according to the present embodiment, the device management server 200 requests the terminal device 300 to acquire the device and status information of the local device 400, namely transmits a device and status information acquisition request (device information request) to the terminal device 300 (Step S701). Upon receiving the request, the terminal device 300 requests the local device 400 connected to the own device (i.e., the terminal device 300) to acquire the device and status information of the local device 400, namely transmits the device and status information acquisition request to the local device 400 (Step S702).

Upon receiving the request, the local device 400 acquires device and status information stored in the own device (i.e., the local device 400) and transmits the device and status information to the terminal device 300 (Step S703). Upon receiving the device and status information from the local device 400, the terminal device 300 transmits the device and status information of the local device 400 to the device management server 200 (Step S704).

Subsequently, the device management server 200 compares the received device and status information of the local device 400 with device and status information stored in the device and status database 210, and determines whether the local device 400 indicated by the device and status information acquired in Step S704 is identical to a local device, which is one of the local devices 400, having device and status information previously acquired and stored in the device and status database 210 or not (Step S705).

More specifically, in the device management server 200, the determination unit 232 determines whether a serial number and an IP address included in the acquired device and status information are identical to those of the device and status information stored in the device and status database 210 or not.

When the corresponding, namely the identical, device and status information is stored in the device and status database 210, the determination unit 232 determines that the local device 400 currently connected to the terminal device 300 is identical to a local device, which is one of the local devices 400, having the device and status information previously acquired and stored in the device and status database 210.

On the other hand, when the corresponding, namely the identical, device and status information is not stored in the device and status database 210, the determination unit 232 determines that the local device 400 currently connected to the terminal device 300 is not identical to a local device, which is one of the local devices 400, having the device and status information previously acquired and stored in the device and status database 210.

When the determination in Step S705 indicates that the currently-connected local device 400 is different from the previous one used in the past, the license control unit 231 of the device management server 200 requests the terminal device 300 to acquire license information of the currently-connected local device 400, namely transmits a license information acquisition request to the terminal device 300 (Step S706).

Upon receiving the request, the terminal device 300 requests the local device 400 to acquire the license information, namely transmits the license information acquisition request to the local device 400 (Step S707). Upon receiving the request, the local device 400 transmits the license information retained by the own device (i.e., local device 400) to the terminal device 300 (Step S708). Note that the license information retained by the local device 400 may be information including a license ID and information on one or more supported functions.

Then, the terminal device 300 transmits the license information to the device management server 200 (Step S709).

Upon acquiring the license information from the terminal device 300, the device management server 200 transmits the acquired license information and a license information authentication request to the authentication server 600 (Step S710). At this time, the license information is transmitted to the authentication server 600 in association with the serial number included in the device and status information acquired in Step S704.

Upon receiving the license information authentication request from the device management server 200, the authentication server 600 refers to the license database 610, performs authentication (Step S711), and transmits a result of the authentication to the device management server 200 (Step S712).

More specifically, the authentication server 600 authenticates the license information when there is a license ID that is same as the license ID included in the received license information is stored in the license database 610.

When the license information is authenticated in Steps S711 and S712, the device management server 200 overwrites, with the device and status information acquired in Step S704, to update the device and status database 210 (Step S713). In other words, the device management server 200 reflects (applies) the device and status information acquired in Step S704 to the corresponding device and status information in the device and status database 210.

When the license information is not authenticated in Steps S711 and S712, the device management server 200 adds the device and status information acquired in Step S704 to the device and status database 210 as device and status information of the new local device 400, namely newly stores the acquired device and status information in the device and status database 210. That is, the device management server 200 registers the local device 400 corresponding to the currently acquired device and status information as a new local device (Step S714).

Figure 8:
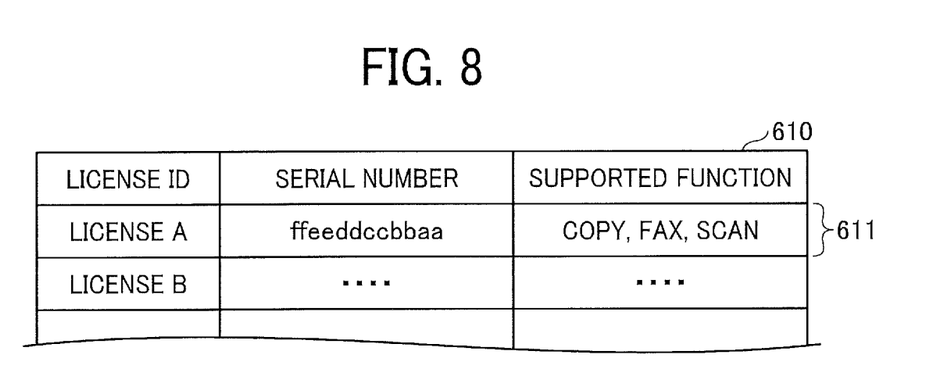
FIG. 8 is an illustration for explaining update of a license database, according to an embodiment of the present disclosure.
Figure 9:
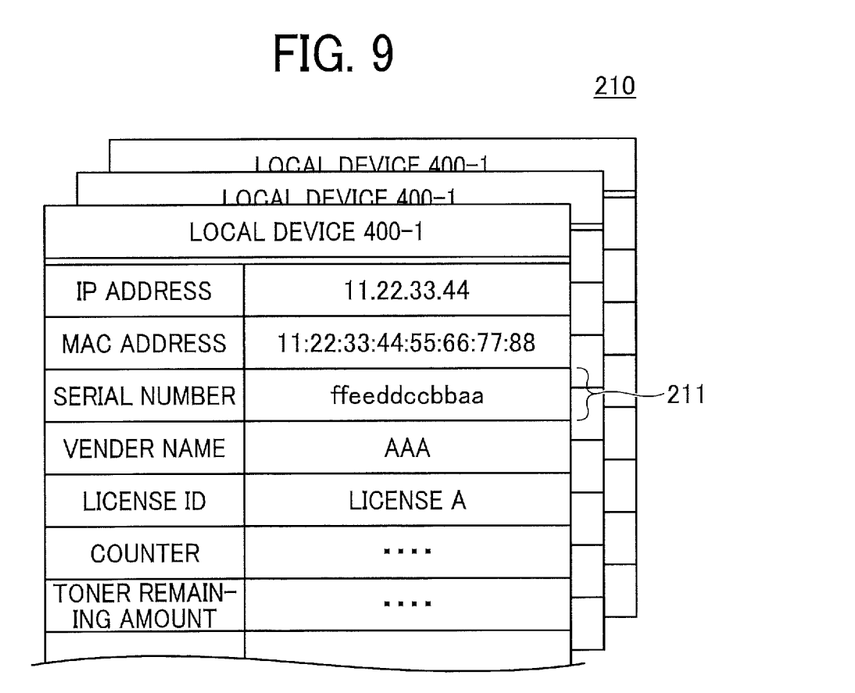
FIG. 9 is an illustration for explaining update of a device and status database, according to an embodiment of the present disclosure.

A description is now given of update of the device and status database 210 in Step S713, with reference to FIG. 8 and FIG. 9.

In the example case of the following description, the local device 400 connected to the terminal device 300 is replaced with a local device 400-1, and the local device 400-1 is given with a license that is same as the one owned by the local device 400.

In this example case, a serial number of the local device 400-1 corresponding to the license ID is updated in the license database 610 of the authentication server 600, as illustrated in FIG. 8.

FIG. 8 is an illustration for explaining update of the license database 610, according to the present embodiment. In FIG. 8, the license ID of "license A" and the serial number of "ffeeddccbbaa" are associated with each other, and the serial number in FIG. 8 is different from the serial number associated with the license ID of "license A" in FIG. 4.

The license ID and the serial number may be associated with each other in advance by, for example, the administrator or the like of the device management system 100.

When, with this state, the device management server 200 acquires device and status information from the local device 400-1 and searches the device and status database 210, there is no device and status information that has a serial number identical to the serial number of the local device 400-1. Accordingly, the device management server 200 determines, in Step S705 of FIG. 7, that the local device 400-1 is not the same device as the local device 400 that was connected to the terminal device 300 in the past.

Subsequently, the device management server 200 acquires license information from the local device 400-1 via the terminal device 300 and transmits an authentication request to the authentication server 600. At this time, for example, the device management server 200 transmits the serial number of "ffeeddccbbaa" of the local device 400-1 and the license ID retained by the local device 400-1 to the authentication server 600.

In the authentication server 600, as illustrated in FIG. 8, the serial number "ffeeddccbbaa" is associated with the license ID of "license A", and the local device 400-1 is authenticated.

The device management server 200 rewrites the serial number of the device and status information of the local device 400 stored in the device and status database 210 to the serial number of the local device 400-1 to reflect the device and status information acquired from the local device 400-1 to the device and status information stored in the device and status database 210.

FIG. 9 is an illustration for explaining update of the device and status database 210, according to the present embodiment. In FIG. 9, the device and status information of the local device 400-1, in which the serial number is changed from that of the device and status information of the local device 400 in FIG. 3 to the serial number of the local device 400-1, is illustrated. In other words, the device and status information acquired from the local device 400-1 (new local device) is reflected to the device and status information of the local device 400 (previous local device) stored in the device and status database 210.

That is, in the device and status database 210, the information stored as the device and status information of the local device 400 is taken over (transferred, inherited) as the device and status information of the local device 400-1.

In the description above, the example in which the local device 400 is replaced with the local device 400-1 is described. However, the disclosure is not limited thereto, and for example, an example in which a connection destination of the local device 400 is changed from the terminal device 300 to another terminal device 300, is also applied.

In such an example, when the device management server 200 compares the device and status information of the local device 400 acquired via the other terminal device 300 with the device and status information of the local device 400 stored in the device and status database 210, the IP addresses are different from each other.

Accordingly, the device management server 200 acquires license information from the local device 400 via the other terminal device 300, and transmits an authentication request to the authentication server 600.

In this example, because the serial number of the local device 400 does not change, the local device 400 is authenticated.

Upon receiving the authentication, the device management server 200 updates the IP address of the device and status information of the local device 400 stored in the device and status database 210 with the IP address included in the device and status information of the local device 400 currently acquired via the other terminal device 300. That is, in the device and status database 210, only the IP address of the device and status information of the local device 400 is changed, and the other part of the device and status information of the local device 400 is taken over (inherited) as it is (as being maintained).

Accordingly, for example, when the local device 400 is an image forming apparatus that charges according to the number of printed sheets, even if the image forming apparatus is replaced with another image forming apparatus, the counter value indicating the number of printed sheets is continuously kept as it is. In addition, in the present embodiment, for example, even when the installation location of the image forming apparatus is changed, the remaining toner amount and the counter value of the number of printed sheets of the image forming apparatus are continuously kept as it is.

Therefore, according to the present embodiment, it is possible to appropriately perform the information maintenance work of the local device 400.

Further, in the present embodiment, when the license information acquired from the local device 400 is not authenticated in the authentication server 600, whether to update the license information or not may be inquired. A process performed by the device management system 100 in the case where whether to update the license information or not may be inquired is described below.

Figure 10A:
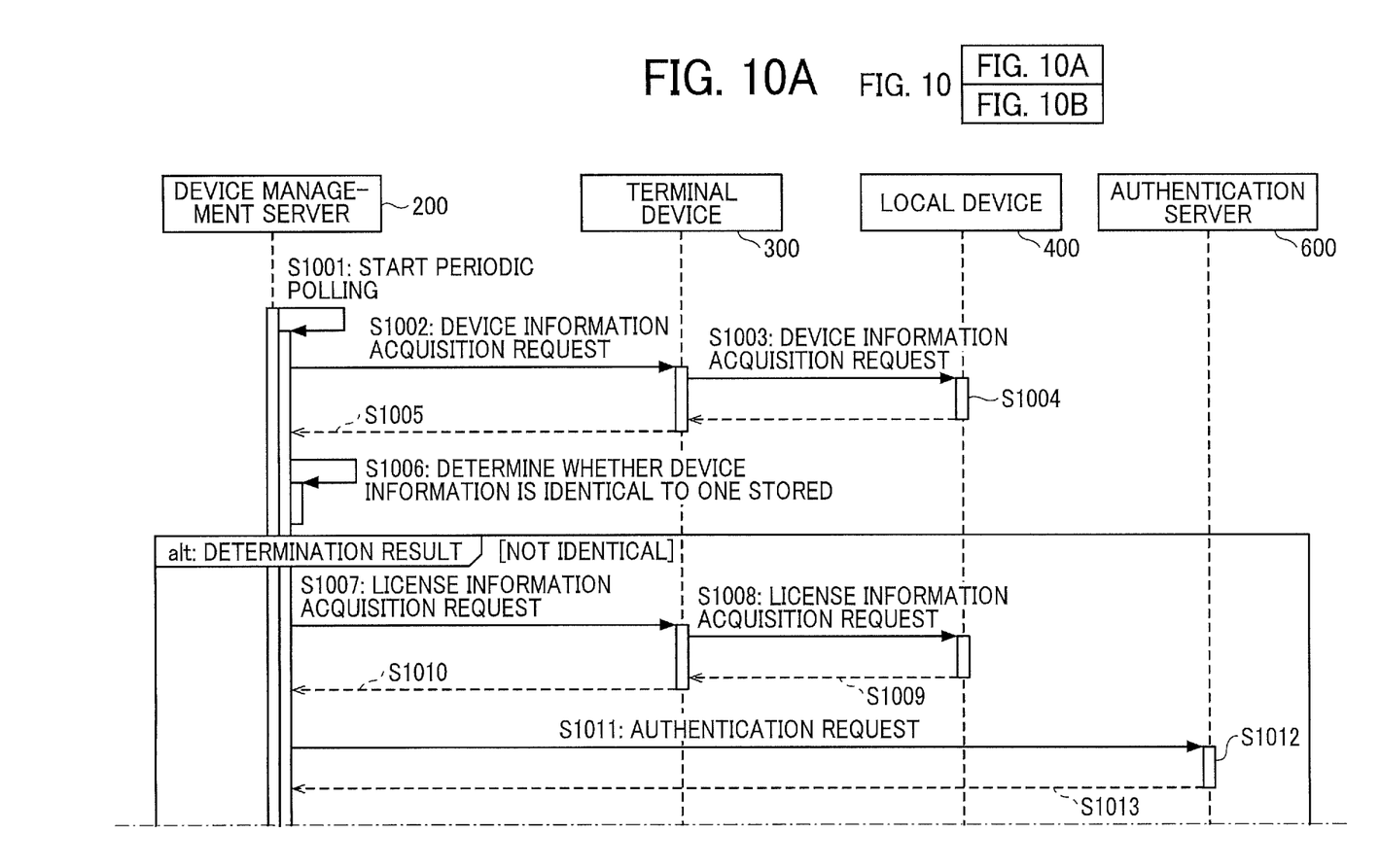
FIG. 10A and FIG. 10B (FIG. 10) are a sequence diagram illustrating a process performed by a device management system according to an embodiment of the present disclosure.
Figure 10B:
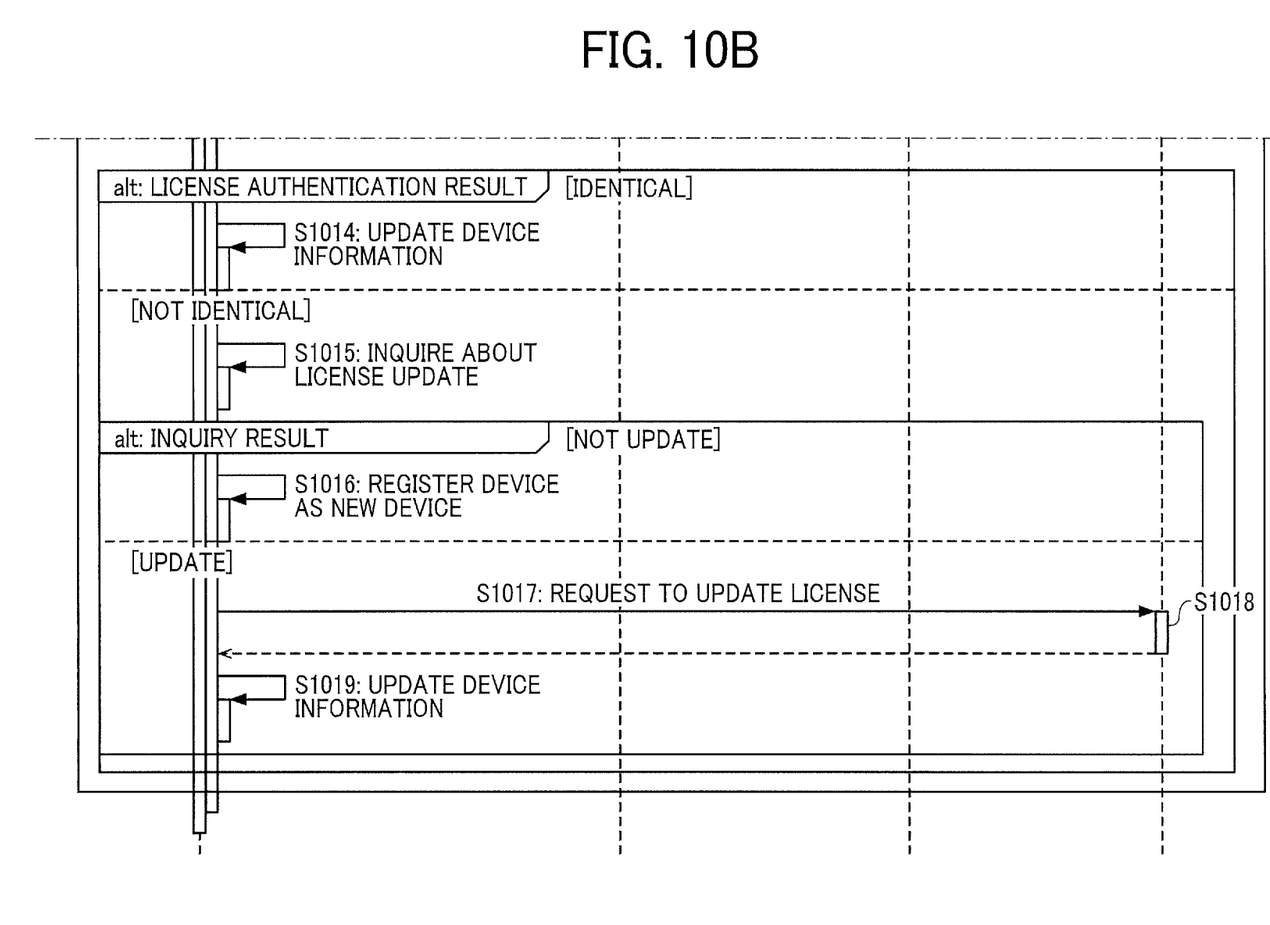

FIG. 10, which includes FIG. 10A and FIG. 10B, is another sequence diagram illustrating a process performed by the device management system 100.

In the example of FIG. 10 (FIG. 10A and FIG. 10B), the device management server 200 periodically starts polling to acquire device and status information of the local device 400 (Step S1001).

Processing of Steps S1002 to S1014 in FIG. 10 (FIG. 10A and FIG. 10B) is the same as the processing of Steps S701 to S713 in FIG. 7, and a redundant description is omitted here.

When the license information is not authenticated by the authentication server 600, the UI control unit 222 of the device management server 200 causes the output device 22 or the management terminal for the device management server 200 to display a screen for receiving an input indicating whether to update the license information of the local device 400 or not (Step S1015).

More specifically, the UI control unit 222 may display a screen for receiving a user operation of selecting whether to update the license information or not.

When a selection of not updating the license information is made, the device management server 200 adds the device and status information acquired in Step S1005 to the device and status database 210 as device and status information of the new local device 400, namely newly stores the device and status information in the device and status database 210 (Step S1016).

In addition, when a selection of updating the license information is made, the device management server 200 requests the authentication server 600 to update the license information (Step S1017). More specifically, the UI control unit 222 of the device management server 200 may cause the output device 22 or a display of the management terminal for the device management server 200 to display an input screen for inputting for the license information associated with the device and status information acquired in Step S1005.

The authentication server 600 receives the input of the license information from the device management server 200 and updates the license database 610 (Step S1018).

Subsequently, the device management server 200 stores the device and status information acquired in Step S1005 as new device and status information in the device and status database 210 (Step S1019), and the process ends.

In the examples of FIG. 7 and FIG. 10 (FIG. 10A and FIG. 10B), the device management server 200 transmits the device and status information acquisition request and the license information acquisition request to the terminal device 300 at different times, but the disclosure is not limited thereto. The device management server 200 may simultaneously transmit the device and status information acquisition request and the license information acquisition request to the terminal device 300.

When receiving the device and status information acquisition request and the license information acquisition request at the same time, the terminal device 300 may acquire both of device and status information and license information from the local device 400 and transmit both of the device and status information and the license information to the device management server 200.

In a known system, when a local device is replaced or a port name of the local device is changed, the local device is regarded as a new type of device so that device and status information thereof is not taken over (inherited), and this may cause a problem in performing maintenance for information on the local device.

According to the embodiment described above, it is possible to take over (inherit) the information on the local device and information on statuses related to the local device.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A device management apparatus communicably connected to, a terminal device through a network, comprising a processor configured to:
   acquire, via the terminal device, first device information that is information on a specific device connected to the terminal device, and license information indicating a license given to the specific device, said first device information including a serial number, an IP address and usage status information of the specific device;
   refer to a memory that stores second device information to determine whether the acquired serial number and IP address of the first device information are identical to the second device information; and
   transmit, when at least one of the serial number or IP address of the first device information is different from the second device information, the license information to an authentication server to determine whether to reflect the first device information to the second device information according to an authentication result received from the authentication server,
   wherein the processor is configured to:
   determine whether the acquired first device information is identical to the second device information based on a serial number and an IP address of the specific device, and
   reflect the first device information to the second device information upon determining that at least one of the serial number or the IP address of the first device information is different from those of the second device information, thereby omitting a process of storing the first device information as a new entry in the memory,
   wherein the usage status information includes a counter value and a toner remaining amount.

2. The device management apparatus according to claim 1,
   wherein, when the authentication result received from the authentication server indicates that the license information is authenticated, the processor updates, in the memory, the second device information with the acquired first device information.

3. The device management apparatus according to claim 1,
   wherein, when the authentication result received from the authentication server indicates that the license information is not authenticated, the processor newly stores, in the memory, the acquired first device information.

4. The device management apparatus according to claim 3,
wherein, when the authentication result received from the authentication server indicates that the license information is not authenticated, the processor,
displays, on a display, a screen for receiving a user operation of selecting whether to update the license information, and
displays, on the display, an input screen for receiving an input of the license information in, response to the user operation of selecting to update the license information.

5. The device management apparatus according to claim 1,
wherein, when the processor determines that the first device information is different from the second device information, the processor acquires, via the terminal device, the license information indicating the license given to the specific device.

6. A device management system, comprising:
the device management apparatus according to claim 1; and
the terminal device communicably connected to the device management apparatus through a network.

7. A method for managing a device, performed by a device management apparatus, the method comprising:
acquiring, via a terminal device communicably connected to the device management apparatus, first device information that is information on a specific device connected to the terminal device and license information indicating a license given to the specific device, said first device information including a serial number, an IP address and usage status information of the specific device;
referring to a memory that stores second device information to determine whether the acquired serial number and IP address of the first device information are identical to those of the second device information; and
transmitting, when at least one of the serial number or IP address of the first device information is different from the second device information, the license information to an authentication server to determine whether to reflect the first device information to the second device information according to an authentication result received from the authentication server,
wherein the method further comprises:
determining whether the acquired first device information is identical to the second device information based on a serial number and, an IP address of the specific device, and
reflecting the first device information to the second device information upon determining that at least one of the serial number or the IP address of the first device information is different from those of the second device information, thereby omitting a process of storing the first device information as a new entry in the memory,
wherein the usage status information includes a counter value and a toner remaining amount.

8. A non-transitory recording medium storing a plurality of instructions which, when executed by one or more processors, cause the processors to perform a method, comprising:
acquiring, via a terminal device communicably connected to a device management apparatus, first device information that is information on a specific device connected to the terminal device and license information indicating a license given to the specific device, said first device information including a serial number, an IP address and usage status information of the specific device;
referring to a memory that stores second device information to determine whether the acquired serial number and IP address of the first device information are identical to the second device information; and
transmitting, when at least one of the serial number or IP address of the first device information is different from the second device information, the license information to an authentication server to determine whether to reflect the first device information to the second device information according to an authentication result received from the authentication server,
wherein the method further comprises:
determining whether the acquired first device information is identical to the second device information based on a serial number and an IP address of the specific device, and
reflecting the first device information to the second device information upon determining that at least one of the serial number or the IP address of the first device information is different from those of the second device information, thereby omitting a process of storing the first device information as a new entry in the memory,
wherein the usage status information includes a counter value and a toner remaining amount.

9. The device management apparatus according to claim 1,
wherein the processor is configured to reflect the first device information to the second device information upon determining that a license ID of the license information exists in a license database provided in, the authentication server.

* * * * *